Patented Aug. 22, 1950

2,519,560

UNITED STATES PATENT OFFICE 2,519,560

PREPARATION OF PROPYLENEDIAMINE

George Wright Fowler, Charleston, W. Va., assignor, by mesne assignments, to Union Carbide and Carbon Corporation, a corporation of New York No Drawing. Application October 24, 1947, Serial No. 782,021

5 Claims. (Cl. 260—585)

This invention relates to the manufacture of propylenediamine. It is more particularly concerned with an improved method of making propylenediamine by amination of 1-aminopropanol-2 in the presence of ammonia and a hydrogenation catalyst.

It is known that monohydric alcohols may be reacted with ammonia, in the presence of a hydrogenation catalyst to form a mixture of amines, possibly including side reaction products. The rate of conversion of the alcohols to the amines usually is relatively slow for commercial purposes, and the yields are not high, particularly of the primary amines. When a dihydric alcohol, such as tetramethylene glycol or pentamethylene glycol is reacted with ammonia in the presence of a hydrogenation catalyst, a considerable amount of cyclization occurs with the formation of compounds such as pyrrol and pyridine. In the case of 1,2-propylene glycol (propanediol-1,2) the product is 2-aminopropanol-1 in low yield.

This invention is based upon my discovery that 1,2-propanediamine is produced in good yield and at a high rate of conversion by amination of 1-aminopropanol-2. The reaction may be illustrated by the following equation:

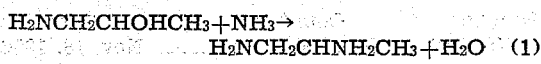

$H_2NCH_2CHOHCH_3 + NH_3 \rightarrow H_2NCH_2CHNH_2CH_3 + H_2O$  (1)

The reaction may be carried out by heating 1-aminopropanol-2 with approximately an equimolar amount of ammonia in the presence of a hydrogenation catalyst. The temperatures and pressures under which the reaction may be carried out do not appear to be highly critical and considerable latitude is available for choice of conditions. With a good proportion of active catalyst, about 0.07 part of catalyst per part of the aminopropanol, the reaction proceeds at temperatures below 160° C. With a lower proportion of catalyst, or with a less active catalyst, a temperature above 180° C. may be required. In general, it is not advantageous to resort to temperatures below 125° C. or much above 250° C. At lower temperatures the reaction tends to proceed too slowly, and higher temperatures favor the formation of high boiling products. Excellent results are obtainable at a temperature of about 170° to 200° C. which seems to aid in minimizing the formation of products other than propylenediamine, and is preferred.

As catalyst, there may be employed such hydrogenation catalysts as nickel, cobalt, copper chromite and the like, including the commercially available supported catalysts of nickel. Excellent results were obtained with finely divided nickel or cobalt prepared by dissolving non-catalytic metals out of their alloys with nickel or cobalt.

In carrying out the reaction the 1-aminopropanol-2 may be charged in a suitable bomb or autoclave, together with an approximately equimolar amount of ammonia and the catalyst, and the reaction mixture heated to a temperature of about 175° C. At this temperature a pressure of about 675 to 700 psi, gage, may be developed in the reactor, but as the reaction proceeds the pressure is observed to fall off somewhat. If desired, the reaction may also be carried out in the presence of hydrogen. The presence of hydrogen does not affect the yield but seems to favor a somewhat less highly colored reaction mixture. The hydrogen may be admitted to the reactor or autoclave to a suitable total pressure, for instance from about 250 to 600 psi, gage, at room temperature, bearing in mind the strength of the reactor used and the fact that the pressure increases markedly with rise in temperature. On heating the reaction mixture with added hydrogen, the total pressure may be permitted to reach as high as 1000 to 2000 psi, gage, if desired, but usually a total pressure of from about 1000 to 1500 psi, gage, or below, will be found more convenient.

After the reaction mixture is heated for a period of several hours to complete the reaction either with or without hydrogen, the pressure may be released and the propylenediamine product separated by distillation. Yields as high as 50 to 65 per cent are obtainable in batch operation.

The invention may be further illustrated by the following examples:

Example 1

A mixture of 743 parts (9.9 mols) of monoisopropanolamine (1-aminopropanol-2), 227 parts (13.3 mols) of anhydrous ammonia and 25 parts of Raney nickel on a contained metal basis, all by weight, was heated under hydrogen pressure in a rocking autoclave to a temperature of 180° C. and maintained at that temperature for a period of about 5.5 hours. A total pressure of about 1500 psi, gage, was attained during the heating. At the end of that time the autoclave was cooled, the pressure released and the products separated by distillation. There was obtained 443 parts of propylenediamine corresponding to a yield of 61 per cent. The unreacted starting material and some 2,5-dimethylpiperazine accounted for the remainder.

Example 2

A charge of 2640 parts (35.2 mols) of monoisopropanolamine, 485 parts (28.5 mols) of anhydrous ammonia and 75 parts of Raney nickel on a contained metal basis, all by weight, was heated under hydrogen pressure, with stirring, for a period of approximately eight hours at a temperature of about 185° C. The maximum pressure attained was 1100 psi, gage. The resulting reaction mixture was found to contain 1,2-propanediamine in a concentration of about 48 per cent, by weight. Unreacted monoisopropanolamine and small amounts of higher boiling products comprised the remainder. The estimated yield of 1,2-propanediamine was about 65 per cent of theory.

For purposes of comparison with the foregoing examples, a mixture of 760 parts (10 mols) of propylene glycol (propanediol-1,2), 225 parts (13.2 mols) of anhydrous ammonia and 25 parts of Raney nickel catalyst on a contained metal basis, by weight, was charged to a rocking autoclave. Hydrogen was admitted up to a gage pressure of 400 psi at room temperature, and the mixture heated for a period of about 6.5 hours at a temperature of about 180° C. Upon completion of the reaction the pressure was released and the product distilled. There was obtained 119 parts of aminopropanol, as indicated by titration, which corresponds to a yield of 16 per cent of theory. Five hundred ninety-eight parts of starting glycol, 79 per cent, was recovered unchanged.

Example 3

A charge comprising 753 parts (10 mols) of monoisopropanolamine, 191 parts (11.3 mols) ammonia and 50 parts of Raney nickel on a contained dry basis was heated in a rocking autoclave at a temperature of 174° C. for a period of about five hours. A pressure of about 675 psi, gage, was developed, but at the end of the reaction period the pressure had decreased to 550 psi, gage. Upon distillation and analysis, the reaction mixture was found to contain 389 parts of propylenediamine, corresponding to a yield of 52.6 per cent. Other components were higher boiling products, unreacted monoisopropanolamine and water.

The monoisopropanolamine which is a starting material in my process may be readily prepared by the reaction of ammonia and propylene oxide in known ways.

By the symbol psi as used herein is meant pressure, in pounds per square inch. All parts are by weight unless otherwise specified.

The process is susceptible of modification within the scope of the appended claims.

I claim:
1. A liquid phase process for making 1,2-propanediamine wherein -1-aminopropanol-2 in the liquid phase is heated with ammonia in the presence of a hydrogenation catalyst.
2. A liquid phase process for making 1,2-propanediamine wherein 1-aminopropanol-2 in the liquid phase is heated with ammonia in the presence of a hydrogenation catalyst at a temperature of about 150° to 250° C. and at a total pressure of about 400 to 2000 pounds per square inch, gage.
3. A liquid phase process for making 1,2-propanediamine wherein 1-aminopropanol-2 in the liquid phase is heated with ammonia in the presence of a hydrogenation catalyst at a temperature of about 170° to 200° C. and at a total pressure of about 400 to 2000 pounds per square inch, gage.
4. A liquid phase process for making 1,2-propanediamine wherein 1-aminopropanol-2 in the liquid phase is heated with ammonia in the presence of a finely divided metallic hydrogenation catalyst.
5. A liquid phase process for making 1,2-propanediamine wherein 1-aminopropanol-2 in the liquid phase is heated with ammonia in the presence of a hydrogenation catalyst of the group consisting of nickel and cobalt in a finely divided state.

GEORGE WRIGHT FOWLER.

REFERENCES CITED

The following references are of record in the file of this patent:

UNITED STATES PATENTS

| Number | Name | Date |
|---|---|---|
| 2,053,193 | Guinot | Sept. 1, 1936 |
| 2,365,721 | Olin et al. | Dec. 21, 1944 |

FOREIGN PATENTS

| Number | Country | Date |
|---|---|---|
| 456,952 | Great Britain | Nov. 18, 1936 |